United States Patent
Jadhav

(10) Patent No.: US 12,463,910 B2
(45) Date of Patent: Nov. 4, 2025

(54) METHOD AND APPARATUS FOR EFFICIENT PACKING OF FLOW CONTROL UNITS

(71) Applicant: Arm Limited, Cambridge (GB)

(72) Inventor: Satyajit Arvind Jadhav, Austin, TX (US)

(73) Assignee: Arm Limited, Cambridge (GB)

( * ) Notice: Subject to any disclaimer, the term of this patent is extended or adjusted under 35 U.S.C. 154(b) by 63 days.

(21) Appl. No.: 18/531,909

(22) Filed: Dec. 7, 2023

(65) Prior Publication Data
US 2025/0193119 A1    Jun. 12, 2025

(51) Int. Cl.
*H04L 47/24* (2022.01)
*H04L 45/00* (2022.01)
*H04L 47/62* (2022.01)

(52) U.S. Cl.
CPC ........ *H04L 47/2458* (2013.01); *H04L 45/566* (2013.01); *H04L 47/6215* (2013.01)

(58) Field of Classification Search
CPC ........ H04L 47/2458; H04L 47/6215; H04L 45/566
See application file for complete search history.

(56) References Cited

U.S. PATENT DOCUMENTS

| | | | | |
|---|---|---|---|---|
| 5,717,745 A | * | 2/1998 | Vijay | H04L 9/40 379/114.03 |
| 5,844,980 A | * | 12/1998 | Patel | H04M 3/523 379/88.22 |
| 2013/0311638 A1 | * | 11/2013 | Lord | G06F 16/25 709/224 |
| 2013/0324142 A1 | * | 12/2013 | Kanamarlapudi | H04W 72/56 455/452.1 |
| 2023/0269624 A1 | * | 8/2023 | Hu | H04L 47/10 370/235 |
| 2024/0087550 A1 | * | 3/2024 | Sato | G10H 1/043 |
| 2024/0381129 A1 | * | 11/2024 | Uniyal | H04L 43/0817 |

OTHER PUBLICATIONS

Trik et al., "A new adaptive selection strategy for redcuing latency in networks on chip", Mar. 19, 2023, pp. 9-24, Elservier Publiishing.*
Wang et al, "Dynamic TDM Virtual circuit implementation for NoC", 2008 IEEE Asia Pacific Conference on Circuits and Systems, Nov. 30, 2008, IEEE Publishing.*
Al Faruque et al, "Bounded Arbitration algorithm for QoS supported on-chip communication", Oct. 22, 206, ACM Publishing.*

* cited by examiner

*Primary Examiner* — Todd L Barker
(74) *Attorney, Agent, or Firm* — Leveque Intellectual Property Law, PC.

(57) ABSTRACT

Messages and data are dynamically selected for packing into an information packet for transmission across a communication link of the data processing network. The number of messages (zero or more) of each message kind to be packed is determined based, at least in part, on the number of slots available to be packed, on the number of pending messages of each kind and on a dynamically determined priority setting. The priority may be user controlled, dependent on input backpressure and/or dependent on target loading, for example. The number of messages of each message kind to be packed may be determined using a hardware lookup table.

20 Claims, 18 Drawing Sheets

| chunk | waiting data blocks | H_slot | data_blocks_cnt | slots_available |
|---|---|---|---|---|
| 0 | 0/1/2/3 | 1 | 0/1/2/3 | 4/3/2/1 |
| 0 | ≥4 | 1 | 3 | 1 |
| 1 or 2 | 0/1/2/3 | 0 | 0/1/2/3 | 4/3/2/1 |
| 1 or 2 | ≥4 | 0 | 4 | 0 |
| 3 | 0/1/2/3 | 0 | 0/1/2/3 | 3/2/1/0 |
| 3 | ≥4 | 0 | 3 | 0 |
| INPUT | | | OUTPUT | |

| H_slot \| HS_slot | slots available | Priority | req_pending [2:0] | data_hdr_pending [2:0] | resp_pending [2:0] | req_sent_cnt | data_hdr_sent_cnt | resp_sent_cnt |
|---|---|---|---|---|---|---|---|---|
| ? | 4 | ? | 0/1/2/3/4 | 0/1/2/3/4 | 0/1/2/3/4 | 2 | 0/1/2/3/4 | upto 4 (G0) |
| ? | 3 | ? | 0 | 0/1/2/3/4 | 0/1/2/3/4 | 0 | 0/1/2/3/4 | 0/1/2/3/4 |
| 0 | 3 | 0 | 1 | 0/1/2/3/4 | 0/1/2/3/4 | 1 | 0/1/2/3/4 | upto 4 (G0) |
| 1 | 3 | 0 | 1 | 1/2/3/4 | 0/1/2/3/4 | 1 | 1/2/3/4 | upto 3 (G0) |
| ? | 3 | 0 | 1/2/3/4 | 0 | 0/1/2/3/4 | 1 | 0 | 0/1/2/3/4 |
| 0 | 3 | 0 | 1/2/3/4 | 0 | 0/1/2/3/4 | 2 | 0 | 0/1/2/3/4 |
| 1 | 3 | 0 | 1/2/3/4 | 1/2/3/4 | 0 | 2 | 1/2/3/4 | upto 2 in G0 |
| ? | 2 | 0 | 0 | 1/2/3/4 | 1/2/3/4 | 2 | 1/2/3/4 | upto 1 in G0 |
| 0 | 2 | 0 | 0 | 1/2/3/4 | 0/1 | 0 | 0 | 0/1/2/3/4 |
| 1 | 2 | 0 | 0 | 1/2/3/4 | 2/3/4 | 0 | Upto 3 | upto 3 |
| 0 | 2 | 0 | 1 | 0/1/2/3/4 | 0/1/2/3/4 | 0 | 1/2/3/4 | 0 |
| 1 | 2 | 0 | 1 | 0/1/2/3/4 | 0/1/2/3/4 | 1 | 0/1/2/3/4 | upto 2 |
| 0 | 2 | 0 | 1 | 0/1/2/3/4 | 0/1/2/3/4 | 1 | 0 | 0/1 |
| 1 | 2 | 0 | 1/2/3/4 | 0/1/2/3/4 | 0/1/2/3/4 | 2 | 0 | /2/3/4 |
| 0 | 2 | 0 | 1/2/3/4 | 0/1/2/3/4 | 0/1/2/3/4 | 2 | 0 | upto 3 |
| 1 | 2 | 0 | 1/2/3/4 | 0/1/2/3/4 | 0/1/2/3/4 | 2 | 0 | upto 2 in G0 |
| 1 | 2 | 0 | 1/2/3/4 | 0/1/2/3/4 | 0/1/2/3/4 | 2 | 0 | upto 1 in G0 |

INPUT | 900 | OUTPUT

| H_slot / HS_slot | message slots available | Priority | req_pending [2:0] | data_hdr_pending [2:0] | resp_pending [2:0] | req_sent_cnt | data_hdr_sent_cnt | resp_sent_cnt |
|---|---|---|---|---|---|---|---|---|
| 0 | 2 | 1 | 1 | 0 | 0/1/2/3/4 | 1 | 0 | 0/1/2/3/4 |
| 0 | 2 | 1 | 1 | 1/2/3/4 | 0/1/2/3/4 | 1 | 1/2/3/4 | 1 |
| 1 | 2 | 1 | 1 | 1/2/3/4 | 0/1/2/3/4 | 1 | 1/2/3/4 | 0 |
| 0 | 2 | 1 | 1 | 0 | 0/1/2/3/4 | 1 | 0 | upto 3 |
| 0 | 2 | 1 | 2/3/4 | 0 | 0/1/2/3/4 | 2 | 0 | upto 2 in G0 |
| 1 | 2 | 1 | 2/3/4 | 1/2/3/4 | 0/1/2/3/4 | 2 | 0 | upto 1 in G0 |
| 0 | 2 | 1 | 2/3/4 | 1/2/3/4 | 0/1/2/3/4 | 1 | 1/2/3/4 | 0 |
| 0 | 1 | 0 | 0 | 0/1/2/3/4 | 1/2/3/4 | 0 | upto 4 | upto 3 |
| 1 | 1 | 0 | 0 | 0/1/2/3/4 | 1/2/3/4 | 0 | upto 3 | upto 2 |
| 0 | 1 | ? | 0 | 1/2/3/4 | 0 | 0 | 0 | 0 |
| 1 | 1 | ? | 0 | 1/2/3/4 | 0 | 1 | 0 | upto 1 in G0 |
| 0 | 1 | 0 | 1/2/3/4 | 0/1/2/3/4 | 0/1/2/3/4 | 0 | upto 4 | 0 |
| 1 | 1 | 1 | 0/1/2/3/4 | 1/2/3/4 | 1/2/3/4 | 0 | upto 3 | 0 |
| 0 | 0 | 0 | ? | ? | ? | 0 | 0 | 0 |

950

INPUT | OUTPUT

| | msg slots utilized | all | all | all | all | 1 less | all | 2 less | all | 2 less | all | all | all | |
|---|---|---|---|---|---|---|---|---|---|---|---|---|---|---|
| | data sent count | 0 | 4 | 4 | 0 | 0 | 0 | 0 | 0 | 0 | 2 | 3 | 3 | |
| CXL TYPE 1 MESSAGES PACKED | Wr Rsp | 4 | 0 | 0 | 0 | 4 | 0 | 0 | 0 | 0 | 0 | 0 | 0 | PACKING RESULT |
| | Rd Rsp + Data | 2 | 0 | 0 | 0 | 0 | 0 | 0 | 0 | 0 | 0 | 0 | 0 | |
| | Snp Req | 2 | 0 | 0 | 0 | 2 | 0 | 2 | 0 | 2 | 0 | 0 | 0 | |
| CXL TYPE 3 MESSAGES PACKED | Snp Rsp | 0 | 0 | 0 | 3 | 0 | 3 | 0 | 2 | 0 | 0 | 0 | 0 | |
| | Wr Req + data | 0 | 0 | 0 | 0 | 0 | 0 | 0 | 0 | 0 | 1 | 1 | 0 | |
| | Rd Req | 0 | 0 | 0 | 2 | 0 | 3 | 0 | 2 | 0 | 1 | 0 | 0 | |
| 1704 | Arbiter winner | 1 | 0 | 1 | 0 | 1 | 0 | 1 | 0 | 1 | 0 | 0 | 0 | |
| | msg slots avail | 4 | 0 | 0 | 3 | 4 | 4 | 0 | 0 | 0 | 4 | 1 | 0 | |
| CXL TYPE 1 MESSAGES PENDING | Wr Rsp | 8 | 4 | 4 | 4 | 4 | 0 | 0 | 0 | 0 | 0 | 0 | 0 | CURRENT STATE |
| | Rd Rsp + Data | 2 | 2 | 0 | 0 | 0 | 0 | 0 | 0 | 0 | 0 | 0 | 0 | |
| | Snp Req | 8 | 6 | 6 | 6 | 6 | 4 | 4 | 2 | 2 | 0 | 0 | 0 | |
| CXL TYPE 3 MESSAGES PENDING | Snp Rsp | 8 | 8 | 8 | 8 | 5 | 5 | 2 | 2 | 0 | 0 | 0 | 0 | |
| | Wr Req + data | 2 | 2 | 2 | 2 | 2 | 2 | 2 | 2 | 2 | 2 | 1 | 0 | |
| | Rd Req | 8 | 8 | 8 | 8 | 6 | 6 | 3 | 3 | 1 | 1 | 0 | 0 | |
| | waiting data | 0 | 8 | 4 | 0 | 0 | 0 | 0 | 0 | 0 | 0 | 2 | 3 | |
| | chunk number | 0 | 1 | 2 | 3 | 0 | 1 | 2 | 3 | 0 | 1 | 2 | 3 | |
| | Cycle number | 1 | 2 | 3 | 4 | 5 | 6 | 7 | 8 | 9 | 10 | 11 | 12 | |

| | | Cycle 1 | 2 | 3 | 4 | 5 | 6 | 7 | 8 | 9 | 10 | 11 | |
|---|---|---|---|---|---|---|---|---|---|---|---|---|---|
| | msg slots utilized | all | all | all | all | all | all | all | all | all | | 3 remaining | PACKING RESULT |
| | data sent count | 0 | 0 | 0 | 0 | 3 | 1 | 4 | 0 | 3 | 4 | 1 | |
| CXL TYPE 1 MESSAGES PACKED | Wr Rsp | 0 | 2 | 0 | 2 | 0 | 2 | 0 | 2 | 0 | 0 | 0 | |
| | Rd Rsp + Data | 0 | 0 | 0 | 0 | 0 | 0 | 0 | 2 | 0 | 0 | 0 | |
| | Snp Req | 0 | 2 | 0 | 2 | 0 | 2 | 0 | 2 | 0 | 0 | 0 | |
| CXL TYPE 3 MESSAGES PACKED | Snp Rsp | 3 | 3 | 2 | 0 | 0 | 0 | 0 | 0 | 0 | 0 | 0 | |
| | Wr Req + data | 0 | 0 | 0 | 0 | 1 | 1 | 0 | 0 | 0 | 0 | 0 | |
| | Rd Req | 3 | 1 | 3 | 1 | 0 | 0 | 0 | 0 | 0 | 0 | 0 | |
| 1806 { | Data vs non data priority | 0 | 0 | 0 | 0 | 0 | 0 | 0 | 0 | 0 | 0 | 0 | |
| | Type1 or type 3 priority | 0 | 0 | 0 | 0 | 0 | 0 | 0 | 0 | 0 | 0 | 0 | |
| | H_slot | 1 | 0 | 0 | 0 | 1 | 0 | 0 | 0 | 1 | 0 | 0 | 1802 |
| 1804 { | msg slots avail | 4 | 4 | 1 | 3 | 4 | 4 | 0 | 3 | 1 | 0 | 3 | |
| CXL TYPE 1 MESSAGES PENDING | Wr Rsp | 8 | 8 | 6 | 6 | 4 | 4 | 2 | 2 | 0 | 0 | 0 | CURRENT STATE |
| | Rd Rsp + Data | 2 | 2 | 2 | 2 | 2 | 2 | 2 | 2 | 0 | 0 | 0 | |
| | Snp Req | 8 | 8 | 6 | 6 | 4 | 4 | 2 | 2 | 0 | 0 | 0 | |
| CXL TYPE 3 MESSAGES PENDING | Snp Rsp | 8 | 5 | 2 | 0 | 0 | 0 | 0 | 0 | 0 | 0 | 0 | |
| | Wr Req + data | 2 | 2 | 2 | 2 | 2 | 1 | 0 | 0 | 0 | 0 | 0 | |
| | Rd Req | 8 | 5 | 4 | 1 | 0 | 0 | 0 | 0 | 0 | 0 | 0 | |
| | waiting data count | 0 | 0 | 0 | 0 | 0 | 1 | 4 | 0 | 8 | 5 | 1 | |
| | chunk number | 0 | 1 | 2 | 3 | 0 | 1 | 2 | 3 | 0 | 1 | 2 | |
| | Cycle number | 1 | 2 | 3 | 4 | 5 | 6 | 7 | 8 | 9 | 10 | 11 | |

1800

| | | 1 | 2 | 3 | 4 | 5 | 6 | 7 | 8 | 9 | 10 | 11 | 12 |
|---|---|---|---|---|---|---|---|---|---|---|---|---|---|
| | msg slots utilized | all | all | all | all | all | all | all | all | 1 less | all | 4 less (empty) | 1 remaining |
| | data sent count | 3 | 3 | 2 | 0 | 0 | 4 | 4 | 0 | 0 | 0 | 0 | 0 |
| CXL TYPE 1 MESSAGES PACKED | Wr Rsp | 0 | 0 | 0 | 1 | 1 | 0 | 0 | 2 | 0 | 4 | 0 | 0 |
| | Rd Rsp + Data | 0 | 0 | 0 | 0 | 2 | 0 | 0 | 0 | 0 | 0 | 0 | 0 |
| | Snp Req | 0 | 0 | 0 | 1 | 1 | 0 | 0 | 2 | 0 | 2 | 0 | 2 |
| CXL TYPE 3 MESSAGES PACKED | Snp Rsp | 0 | 0 | 3 | 3 | 2 | 0 | 0 | 0 | 0 | 0 | 0 | 0 |
| | Wr Req + data | 1 | 1 | 0 | 0 | 0 | 0 | 0 | 0 | 0 | 0 | 0 | 0 |
| | Rd Req | 0 | 0 | 1 | 1 | 1 | 0 | 0 | 1 | 4 | 0 | 0 | 0 |
| | Data vs non data priority | 1 | 1 | 1 | 1 | 1 | 1 | 1 | 1 | 1 | 1 | 1 | 1 |
| | Type1 or type3 priority | 0 | 0 | 0 | 0 | 0 | 0 | 0 | 0 | 0 | 0 | 0 | 0 |
| | H_slot | 1 | 0 | 0 | 0 | 1 | 0 | 0 | 0 | 1 | 0 | 0 | 0 |
| | msg slots avail | 4 | 2 | 2 | 3 | 4 | 0 | 0 | 3 | 4 | 0 | 0 | 4 |
| CXL TYPE 1 MESSAGES PENDING | Wr Rsp | 8 | 8 | 8 | 8 | 7 | 6 | 6 | 6 | 4 | 4 | 0 | 0 |
| | Rd Rsp + Data | 2 | 2 | 2 | 2 | 2 | 0 | 0 | 0 | 0 | 0 | 0 | 0 |
| | Snp Req | 8 | 8 | 8 | 8 | 7 | 6 | 6 | 6 | 4 | 4 | 2 | 2 |
| CXL TYPE 3 MESSAGES PENDING | Snp Rsp | 8 | 8 | 8 | 5 | 2 | 0 | 0 | 0 | 0 | 0 | 0 | 0 |
| | Wr Req + data | 2 | 1 | 0 | 0 | 0 | 0 | 0 | 0 | 0 | 0 | 0 | 0 |
| | Rd Req | 8 | 8 | 8 | 7 | 6 | 5 | 5 | 5 | 4 | 0 | 0 | 0 |
| | waiting data count | 0 | 1 | 2 | 0 | 0 | 8 | 4 | 0 | 0 | 0 | 0 | 0 |
| | chunk number | 0 | 1 | 2 | 3 | 0 | 1 | 2 | 3 | 0 | 1 | 2 | 3 |
| | Cycle number | 1 | 2 | 3 | 4 | 5 | 6 | 7 | 8 | 9 | 10 | 11 | 12 |

PACKING RESULT

CURRENT STATE

| | | 1 | 2 | 3 | 4 | 5 | 6 | 7 | 8 | 9 | 10 | 11 |
|---|---|---|---|---|---|---|---|---|---|---|---|---|
| | msg slots utilized | all | all | all | all | all | all | all | all | all | 3 remaining | |
| PACKING RESULT | data sent count | 0 | 0 | 0 | 3 | 3 | 2 | 0 | 0 | 3 | 4 | 1 |
| CXL TYPE 1 MESSAGES PACKED | Wr Rsp | 4 | 2 | 2 | 0 | 0 | 0 | 0 | 0 | 0 | 0 | 0 |
| | Rd Rsp + Data | 0 | 0 | 2 | 0 | 0 | 0 | 0 | 0 | 0 | 0 | 0 |
| | Snp Req | 2 | 0 | 2 | 0 | 1 | 1 | 1 | 1 | 0 | 0 | 0 |
| CXL TYPE 3 MESSAGES PACKED | Snp Rsp | 0 | 3 | 0 | 0 | 0 | 0 | 3 | 2 | 0 | 0 | 0 |
| | Wr Req + data | 0 | 0 | 0 | 0 | 0 | 0 | 0 | 1 | 1 | 0 | 0 |
| | Rd Req | 1 | 3 | 1 | 0 | 0 | 1 | 2 | 0 | 0 | 0 | 0 |
| | Data vs non data priority | 0 | 0 | 0 | 0 | 0 | 0 | 0 | 0 | 0 | 0 | 0 |
| | Type1 or type 3 priority | 1 | 1 | 1 | 1 | 1 | 1 | 1 | 1 | 1 | 1 | 1 |
| CURRENT STATE | H_slot | 1 | 0 | 0 | 0 | 1 | 0 | 0 | 0 | 1 | 0 | 0 |
| | msg slots avail | 4 | 4 | 4 | 0 | 1 | 2 | 4 | 3 | 0 | 0 | 3 |
| CXL TYPE 1 MESSAGES PENDING | Wr Rsp | 8 | 4 | 2 | 0 | 0 | 0 | 0 | 0 | 0 | 0 | 0 |
| | Rd Rsp + Data | 2 | 2 | 2 | 0 | 0 | 0 | 0 | 0 | 0 | 0 | 0 |
| | Snp Req | 8 | 6 | 6 | 4 | 4 | 3 | 2 | 1 | 0 | 0 | 0 |
| CXL TYPE 3 MESSAGES PENDING | Snp Rsp | 8 | 8 | 5 | 5 | 5 | 5 | 5 | 2 | 0 | 0 | 0 |
| | Wr Req + data | 2 | 2 | 2 | 2 | 2 | 2 | 2 | 2 | 1 | 0 | 0 |
| | Rd Req | 8 | 7 | 4 | 3 | 3 | 3 | 2 | 0 | 0 | 0 | 0 |
| | waiting data count | 0 | 0 | 0 | 8 | 5 | 2 | 0 | 0 | 4 | 5 | 1 |
| | chunk number | 0 | 1 | 2 | 3 | 0 | 1 | 2 | 3 | 0 | 1 | 2 |
| | Cycle number | 1 | 2 | 3 | 4 | 5 | 6 | 7 | 8 | 9 | 10 | 11 |

| | | | | | | | | | | | | |
|---|---|---|---|---|---|---|---|---|---|---|---|---|
| | msg slots utilized | all | all | all | all | all | all | all | all | all | 2 remaining | |
| | data sent count | 3 | 4 | 1 | 0 | 0 | 0 | 1 | 3 | 2 | 2 | |
| CXL TYPE 1 MESSAGES PACKED | Wr Rsp | 0 | 0 | 5 | 3 | 0 | 0 | 0 | 0 | 0 | 0 | |
| | Rd Rsp + Data | 2 | 0 | 0 | 0 | 0 | 0 | 0 | 0 | 0 | 0 | PACKING RESULT |
| | Snp Req | 0 | 0 | 2 | 0 | 2 | 0 | 2 | 0 | 1 | 0 | |
| CXL TYPE 3 MESSAGES PACKED | Snp Rsp | 0 | 0 | 0 | 0 | 0 | 3 | 3 | 2 | 0 | 0 | |
| | Wr Req + data | 0 | 0 | 0 | 0 | 0 | 0 | 0 | 1 | 0 | 1 | |
| | Rd Req | 0 | 0 | 0 | 2 | 2 | 3 | 1 | 0 | 0 | 0 | |
| | | | | | | | | | | | | |
| | Data vs non data priority | 1 | 1 | 1 | 1 | 1 | 1 | 1 | 1 | 1 | 1 | 2100 |
| | Type1 or type 3 priority | 1 | 1 | 1 | 1 | 1 | 1 | 1 | 1 | 1 | 1 | |
| | | | | | | | | | | | | |
| | H_slot | 1 | 0 | 0 | 0 | 1 | 0 | 0 | 0 | 1 | 0 | 0 |
| | msg slots avail | 4 | 0 | 3 | 3 | 4 | 4 | 4 | 3 | 4 | 4 | 2 |
| CXL TYPE 1 MESSAGES PENDING | Wr Rsp | 8 | 8 | 8 | 3 | 0 | 0 | 0 | 0 | 0 | 0 | 0 |
| | Rd Rsp + Data | 2 | 2 | 0 | 0 | 0 | 0 | 0 | 0 | 0 | 0 | 0 |
| | Snp Req | 8 | 8 | 8 | 6 | 6 | 4 | 4 | 2 | 2 | 1 | 0 |
| CXL TYPE 3 MESSAGES PENDING | Snp Rsp | 8 | 8 | 8 | 8 | 8 | 8 | 5 | 2 | 0 | 0 | 0 | CURRENT STATE |
| | Wr Req + data | 2 | 2 | 2 | 2 | 2 | 2 | 2 | 2 | 1 | 1 | 0 |
| | Rd Req | 8 | 8 | 8 | 8 | 6 | 4 | 1 | 0 | 0 | 0 | 0 |
| | waiting data count | 0 | 5 | 1 | 0 | 0 | 0 | 0 | 3 | 0 | 2 | |
| | | | | | | | | | | | | |
| | chunk number | 0 | 1 | 2 | 3 | 0 | 1 | 2 | 3 | 0 | 1 | 2 |
| | Cycle number | 1 | 2 | 3 | 4 | 5 | 6 | 7 | 8 | 9 | 10 | 11 |

| | | | | | | | | | | | | |
|---|---|---|---|---|---|---|---|---|---|---|---|---|
| msg slots utilized | all | all | all | all | all | all | all | all | all | 4 less (empty) | | 1 remaining |
| data sent count | 0 | 3 | 1 | 2 | 3 | 3 | 4 | 0 | 0 | 0 | 0 | 0 |
| Wr Rsp | 0 | 0 | 4 | 0 | 0 | 0 | 0 | 4 | 0 | 0 | 0 | 0 |
| Rd Rsp + Data | 0 | 0 | 0 | 2 | 0 | 0 | 0 | 0 | 0 | 0 | 0 | 0 |
| Snp Req | 0 | 0 | 2 | 0 | 0 | 0 | 0 | 2 | 0 | 2 | 0 | 2 |
| Snp Rsp | 3 | 0 | 0 | 0 | 0 | 0 | 0 | 0 | 3 | 2 | 0 | 0 |
| Wr Req + data | 0 | 1 | 0 | 0 | 0 | 1 | 0 | 0 | 0 | 0 | 0 | 0 |
| Rd Req | 3 | 0 | 0 | 0 | 1 | 0 | 0 | 0 | 3 | 1 | 0 | 0 |
| Data vs non data priority | 0 | 1 | 0 | 1 | 0 | 1 | 1 | 0 | 1 | 0 | 1 | 0 |
| Type1 or type 3 priority | 0 | 0 | 1 | 1 | 0 | 0 | 0 | 1 | 1 | 0 | 0 | 1 |
| H_slot | 1 | 0 | 0 | 0 | 1 | 0 | 0 | 0 | 1 | 0 | 0 | 0 |
| msg slots avail | 4 | 4 | 0 | 3 | 1 | 1 | 0 | 3 | 4 | 4 | 0 | 3 |
| Wr Rsp | 8 | 8 | 8 | 4 | 4 | 4 | 4 | 4 | 0 | 0 | 0 | 0 |
| Rd Rsp + Data | 2 | 2 | 0 | 0 | 0 | 0 | 0 | 0 | 0 | 0 | 0 | 0 |
| Snp Req | 8 | 8 | 8 | 6 | 6 | 6 | 6 | 6 | 4 | 4 | 2 | 2 |
| Snp Rsp | 8 | 5 | 5 | 5 | 5 | 5 | 5 | 5 | 5 | 2 | 0 | 0 |
| Wr Req + data | 2 | 2 | 1 | 1 | 1 | 1 | 0 | 0 | 0 | 0 | 0 | 0 |
| Rd Req | 8 | 5 | 5 | 5 | 5 | 4 | 4 | 4 | 4 | 1 | 0 | 0 |
| waiting data count | 0 | 0 | 1 | 0 | 6 | 3 | 4 | 0 | 0 | 0 | 0 | 0 |
| chunk number | 0 | 1 | 2 | 3 | 0 | 1 | 2 | 3 | 0 | 1 | 2 | 3 |
| Cycle number | 1 | 2 | 3 | 4 | 5 | 6 | 7 | 8 | 9 | 10 | 11 | 12 |

Row groupings (left side):
- CXL TYPE 1 MESSAGES PACKED: Wr Rsp, Rd Rsp + Data, Snp Req
- CXL TYPE 3 MESSAGES PACKED: Snp Rsp, Wr Req + data, Rd Req
- CXL TYPE 1 MESSAGES PENDING: Wr Rsp, Rd Rsp + Data, Snp Req
- CXL TYPE 3 MESSAGES PENDING: Snp Rsp, Wr Req + data, Rd Req Right-side labels: PACKING RESULT (upper block); CURRENT STATE (lower block). Table reference: 2200.

METHOD AND APPARATUS FOR EFFICIENT PACKING OF FLOW CONTROL UNITS

BACKGROUND

For Chip-to-Chip Interconnects (Die to Die or Socket to Socket) in a data processing system, link layer "flits" are used to transmit the data from one chip to the other. A network flow control unit or "flit" is an atomic block of data that is transported across an interconnect by hardware. One or more transaction messages can be packed in a single flit. In this case, packaging of packets into flits is performed by hardware in the link layer of the network. A group of transaction messages are passed to a flit packing logic block that, in turn, packs the messages into one or more flits. An arbitrator selects between different type of message such that a flit, or chunk thereof, contains messages of a single type. As a result, the flits may be only partially filled, resulting in inefficient data transfer.

A link layer flit is formed by packing protocol messages in accordance with packing rules defined by a specific protocol. Different protocols use different packing rules to form a link layer flit. Solutions for packing logic can be implemented using state machines and/or by arbitrating among different protocol message channel groups. However, state machine solutions add a latency in the packing logic, and arbitration limits performance since different messages are grouped separately.

BRIEF DESCRIPTION OF THE DRAWINGS

The accompanying drawings provide visual representations which will be used to describe various representative embodiments more fully and can be used by those skilled in the art to better understand the representative embodiments disclosed and their inherent advantages. In these drawings, like reference numerals identify corresponding or analogous elements.

FIG. 8 is a diagrammatic representation of a lookup table of a resource logic block, in accordance with various representative embodiments of the present disclosure.

FIGS. 9a and 9b show a lookup table of a packing logic block, in accordance with various representative embodiments of the present disclosure.

FIG. 17 is a table showing operation of gateway packing logic block that uses an arbitrator.

FIGS. 18-22 are tables showing operation of a gateway packing logic block that uses dynamic priority packing, in accordance with various representative embodiments of the present disclosure.

DETAILED DESCRIPTION

Figure 1:
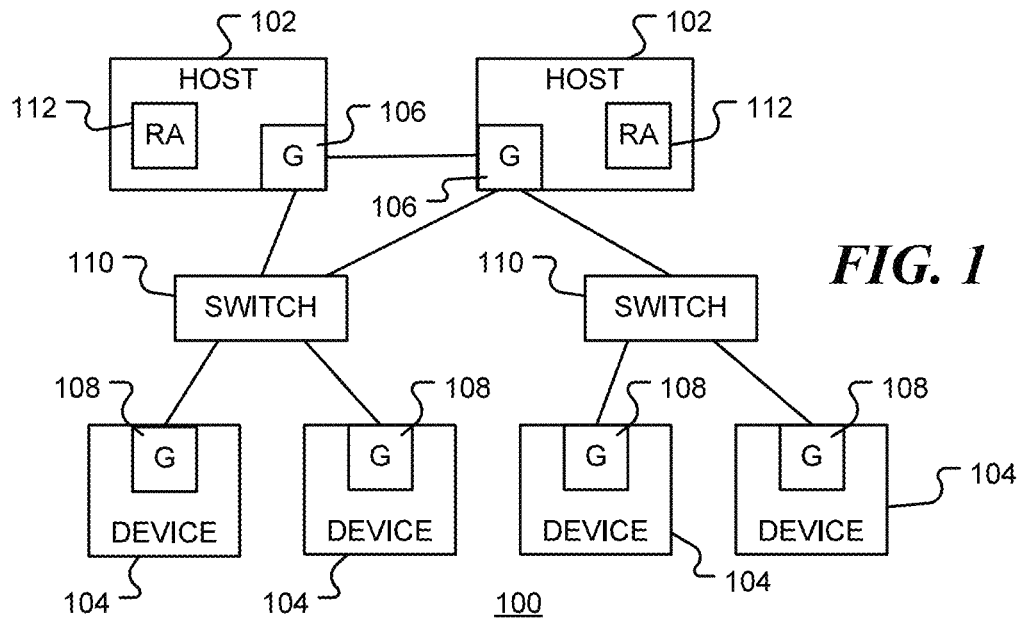
FIG. 1 is a simplified block diagram of a data processing system, in accordance with various embodiments of the present disclosure.

The various apparatus and devices described herein provide mechanisms for packing transaction messages into a network flit in a data processing system.

While this present disclosure is susceptible of embodiment in many different forms, there is shown in the drawings and will herein be described in detail specific embodiments, with the understanding that the embodiments shown and described herein should be considered as providing examples of the principles of the present disclosure and are not intended to limit the present disclosure to the specific embodiments shown and described. In the description below, like reference numerals are used to describe the same, similar or corresponding parts in the several views of the drawings. For simplicity and clarity of illustration, reference numerals may be repeated among the figures to indicate corresponding or analogous elements.

FIG. 1 is a simplified block diagram of a data processing network 100, in accordance with embodiments of the present disclosure. Data processing network 100 includes multiple integrated circuits (ICs) or chips, such as host ICs 102 and device ICs 104. A host IC may include a one or more processors. A chip-to-chip gateway 106 of a host IC 102 couples to corresponding chip-to-chip gateways 108 on device IC 104 to provide one or more communication links. The links enable messages to be passed, in one or more flits, between the host ICs and device ICs. Optionally, the links may include switches 110 to enable a host IC to communicate with two or more device ICs or to enable two or more host ICs to communicate with the same device IC or with each other.

An example link is Compute Express Link™ (CXL™) of the Compute Express Link Consortium, Inc. CXL™ provides a coherent interface for ultra-high-speed transfers between a host and a device, including transaction and link layer protocols together with logical and analog physical layer specifications.

A further example link is a symmetric multi-processor (SMP) link between processors with a shared memory.

Host 102 includes one or more requesting agents, such as a central processing unit (CPU) or CPU cluster.

Transactions between chips may involve an exchange of messages, such as requests and responses. A packing logic block packs transaction messages and data into flow control units or "flits" to be sent over a symmetric multi-processor (SMP) or chip-to-chip (C2C) link. Herein, a packing logic block is an integrated circuit block, or software description thereof, used in a modular data processing chip. In order to increase the bandwidth and link utilization, the packing logic block maximizes the number of request messages and data packed into each flit.

Each gateway 106 is coupled to a request agent 112 of the host by a number of signal channels. Separate channels may be used for different kinds of responses, requests and data, for example.

Various embodiments of the present disclosure relate to computer-implemented method packing messages for transmission across a communication link of in a data processing network. In accordance with the method, pending message counts are determined for two or more message kinds in the data processing network and one or more priorities for sending the message kinds are dynamically determined. A priority indicates when one kind of message is to be packed in preference to another kind and vice versa. In a hardware embodiment, one or more priorities may be signaled by a priority indicator having one or more bits. A message may be a non-data message, such as a request or response message, or data message such as a read or write. Based, at least in part, on the pending message counts and the one or more priorities, a number of messages of one or more message kinds to be packed into a transmission packet is determined and the determined number of messages of one or more message kinds is packed into the transmission packet for transmission across the communication link of the data processing network. The number of messages of one or more message kinds to be packed into the transmission packet may also be based on a size of the transmission packet or the number of available message slots in the transmission packet.

The number of messages of each message kind to be packed into the transmission packet may be determined by accessing a lookup table based, at least in part, on one or more of the pending message counts, the one or more priorities, a number of available message slots in the transmission packet, and a type of the transmission packet. Equivalently, the number of messages of each message kind to be packed may be based on the amount of unused space in the available slots. For each message kind, the number of messages to be packed may be zero or more than zero, so the packed packet may contain no messages, messages of only one kind, or messages of two or more kinds.

The lookup table may be configured based, at least in part, on message sizes and on available space in the transmission packet.

In one embodiment of the computer-implemented method, determining the one or more priorities for sending the message kinds may include dynamically determining priorities by a "weighted round robin" method, where weights of the "weighted round robin" method are based, at least in part, on one or more of the pending message counts, the one or more priorities, a number of available message slots in the transmission packet, and a type of the transmission packet.

The one or more priorities may be determined by monitoring backpressure in one or more pending message queues and increasing a priority for a message kind with higher backpressure.

When the transmission packet is transmitted across the communication link of the data processing network to a target device, the one or more priorities for sending the message kinds may be determined by determining device load in the target device based on feedback from the target device and setting a lower priority for a message kind that increase the device load when the device load is high.

A transmission packet may be combined with one or more other transmission packets to form a flow control unit (flit). The flit may also include header data and error correction data to the flit.

The messages to be packed into the transmission packet may be of mixed kind. For example, a packet may contain one or more messages of a message kind associated with a first priority of the one or more priorities and one or more messages of a message kind associated with a second priority of the one or more priorities.

In accordance with further embodiments, a computer-implemented method includes determining, for two or more message kinds in a data processing network, pending message counts for the message kind for transmission across a communication link of the data processing network and determining a number of messages of one or more message kinds to be packed into a transmission packet by accessing a lookup table. The lookup table may be accessed based, at least in part, on one or more of the pending message counts, a number of available message slots in the transmission packet, and a type of the transmission packet;

The lookup table may also be accessed based on one or more dynamically determine priorities for sending the message kinds.

In accordance with various embodiments, a communication gateway is provided that includes a message queue for each of two or more message kinds configured to store pending messages of the message kind, transmission packet storage, a priority selector circuit configured to generate a priority indicator, and a dynamic priority packing circuit. The dynamic priority packing circuit is configured to determine a number of messages of one or more message kinds to be packed into the transmission packet based, at least in part, on counts of pending messages in the message queues and the priority indicator and pack the determined number of messages into a transmission packet in the transmission packet storage. The communication gateway is configured to transmit the transmission packet to a communication link of a data processing network.

The priority selector circuit may be structured to generate the priority indicator responsive to one or more of an input loading signal, a target loading signal based on feedback from a target device and a user control signal. In addition, the dynamic priority packing circuit may include a lookup table configured to determine the number of messages of one or more message kinds to be packed into the transmission packet.

The dynamic priority packing circuit may be further configured to determine the number of messages of one or more message kinds to be packed into the transmission packet based, at least in part, on either or both of a number of available message slots in the transmission packet and properties of one or more slots in the transmission packet.

The priority indicator may include multiple bits, indicating priorities of different kinds of messages or message groups. For example, the bits of the priority indicator may include a first bit indicating whether priority is given to messages of a first kind or messages of a second kind and a second bit indicating whether priority is given to a data messages or non-data messages.

As described above, an embodiment of the present disclosure relates to a Dynamic Priority Packing Circuit that provides a way to generate a packed link layer flit using a lookup table implemented in hardware. The lookup table identifies which messages to pack in each cycle based on the current priority, which may be dynamically controlled at runtime. The Dynamic Priority Packing circuit operates without needing an arbitration mechanism and without adding extra latency in the link layer. The circuit provides high speed operation and may be used in chip-to-chip communication protocols success as CXL™ (which uses a $6^{th}$ generation Peripheral Component Interface Express (PCIe) physical link, operating at up to 2 GHz). The circuit is not limited to CXL™ and may be used for link layer packing in a wide variety of other protocols.

Figure 2:
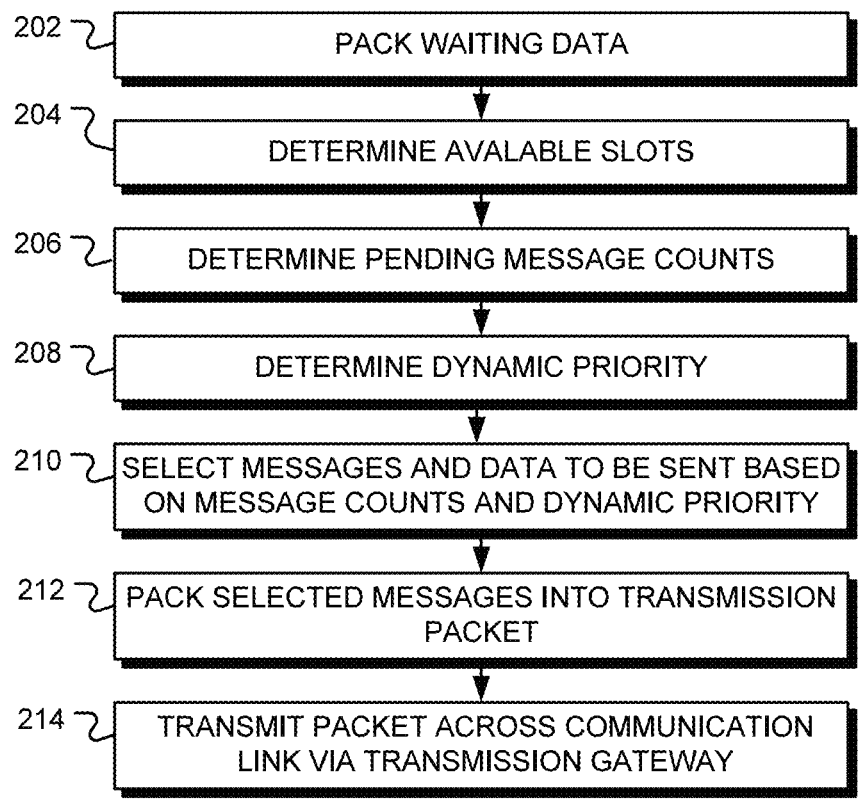
FIG. 2 is a flow chart of a method of flit packing, in accordance with various representative embodiments of the present disclosure.

FIG. 2 is a flow chart 200 of a method of flit packing, in accordance with various representative embodiments. At block 202, any data associated with previously packed data headers is packed into a packet for transmission across a network link. The packet may be, for example, a chunk of a network flit, with each chunk containing a number of slots. Some of the slots may be reserved in accordance with the communication protocol. The number of the number of available slots, not used for waiting data, is determined at block 204, the number of pending messages of each kind is determined at block 206, and a dynamic priority setting is determined at block 208. Based on at least these inputs, the number of messages and data blocks to be packed into the packet are selected at block 210. Other information, such as information relating to the available space in each slot, may also be used in selecting how many messages to pack. To minimize latency, the selection may be made using a lookup table implemented in hardware. The messages and data are retrieved from the pending queues and the packet is packed at block 212. Any header and error information are generated and packed into specified slots at this time. The packet is then transmitted across the communication link at block 214.

In certain embodiments, the number of messages and data blocks to be packed into the packet are determined by accessing a lookup table based on at least these inputs. The lookup table may be used in conjunction with logic blocks. For example, the lookup table may be bypassed when all slots are filled with waiting data, leaving no slots available for messages.

The Dynamic Priority Packing circuit, and method of operation thereof, is described below with reference to an example of packing CXL™ 3 Type 1 messages in a Host computer. However, the same methodology may be applied to other Chip-to-Chip protocols, since each protocol has a set packing rules.

The CXL™ 3 link layer protocol uses a 256-byte flit. This example uses a design which can pack 64-byte chunk in each cycle forming 256-byte flit using 4 chunks. The type 1 host configuration defines 3 channels for host-to-device (H2D) communication: request, response and data header. Thus, "type 1" refers to a group of three kinds of messages.

Figure 3:
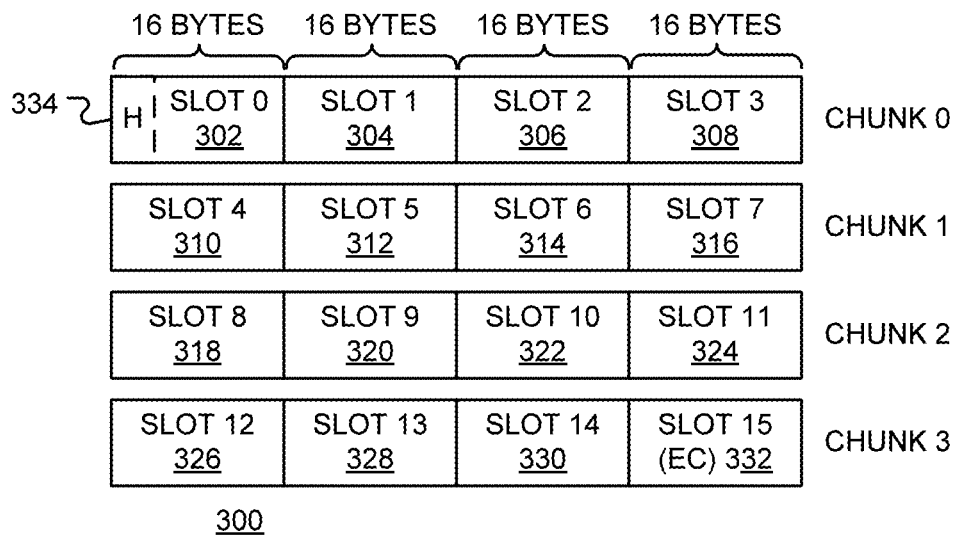
FIG. 3 is a graphical representation of an example 256-byte flit.

FIG. 3 is a graphical representation of an example 256-byte flit, 300, consisting of four 64-byte chunks. Each 64-byte chunk is made up of four 16-byte slots. Chunk 0 contains slots 302, 304, 306 and 308. Chunk 1 contains slots 310, 312, 314 and 316. Chunk 2 contains slots 318, 320, 322 and 324. Chunk 3 contains slots 326, 328, 330 and 332. Slot 0, 302, is a Header slot (H_slot) that contains header data 334. Slots 1-14 are Generic slots, as defined in the protocol, and may be used for messages or data. Slot 0 is for messages only and slot 15 (332) is only for credits and error correction data (Cyclic Redundancy Check (CRC) data and Forward Error Correction (FEC) data.

In each clock cycle, a chunk may be transmitted in a "beat" across the link.

Figure 4:
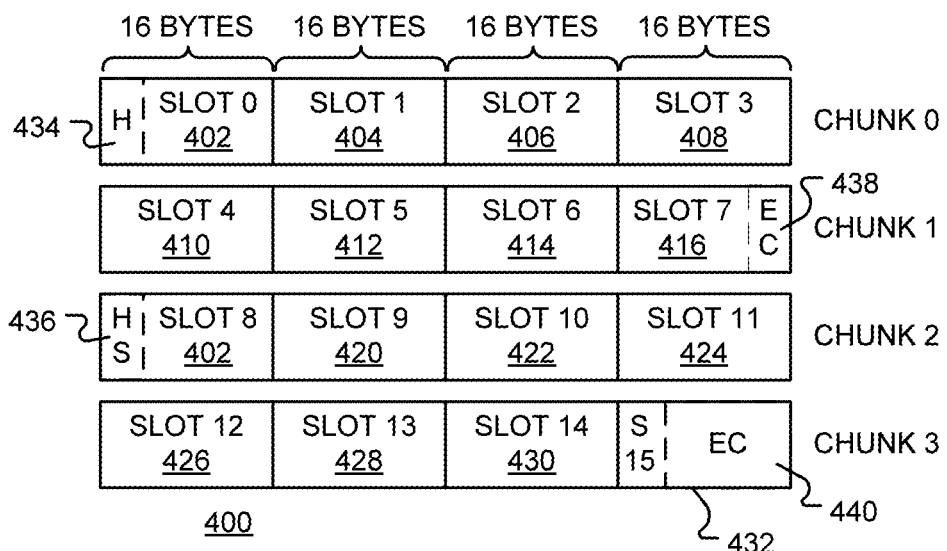
FIG. 4 is a graphical representation of a further example 256-byte flit.

FIG. 4 is a graphical representation of a further example 256-byte flit, 400, consisting of four 64-byte chunks. This flit format is split into two parts and is designed for lower latency. Again, each 64-byte chunk is made up of four 16-byte slots. Chunk 0 contains slots 402, 404, 406 and 408. Chunk 1 contains slots 410, 412, 414 and 416. Chunk 2 contains slots 418, 420, 422 and 424. Chunk 4 contains slots 426, 428, 430 and 432. Slot 0, 402, is a Header slot (H_slot) that contains header data 434. Slot 8 is also a header slot (HS_slot) that contains secondary header data 436. Slots 1-6 and 9-14 are Generic slots, as defined in the protocol, and may be used for messages or data. Slot 7 (416) includes error correction data 438 and slot 15 (432) includes credits and error correction data 440.

Under the CXL™ 3 protocol, for example, a type 1 host packs message into 16-byte slots that can be generic slots or contain a header.

Figure 5A:
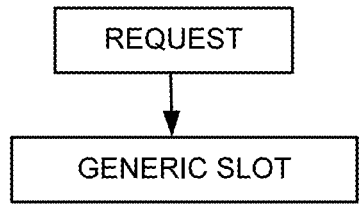
FIGS. 5a-5d show examples of packing options for a 16-byte generic slot of a flit.
Figure 5B:
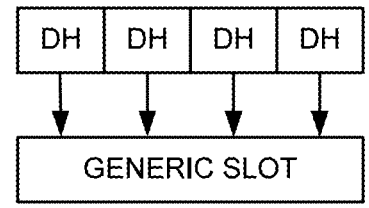
Figure 5C:
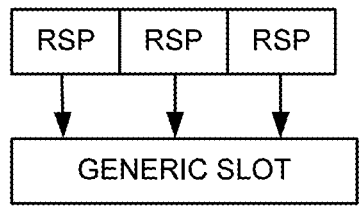
Figure 5D:
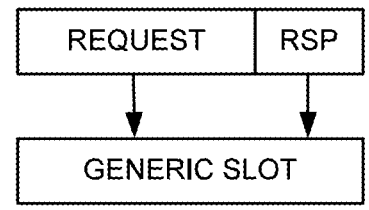

FIGS. 5a-5d show examples of packing options for a 16-byte generic slot. A generic slot can pack:
One host-to-device (H2D) request message (REQ), as shown in FIG. 5a.
Four H2D Data Headers (DH), as shown in FIG. 5b.
Three H2D Responses (RSP), as shown in FIG. 5c.
One H2D response can be sent along with H2D request in Generic 0 slot, as shown in FIG. 5d.
A generic slot can also hold 16-bytes of data.

Figure 6A:
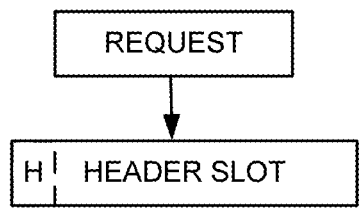
FIGS. 6a-6c show examples of packing options for a 16-byte header slot of a flit.
Figure 6B:
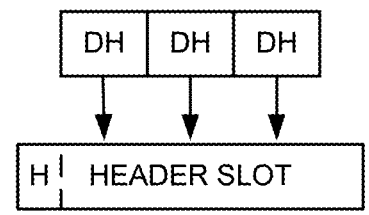
Figure 6C:
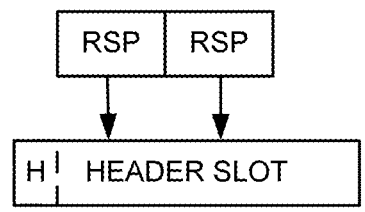

FIGS. 6a-6c show examples of packing options for a 16-byte header slot. A header slot can pack:
One host-to-device (H2D) request message (REQ), as shown in FIG. 6a.
Three H2D Data Headers (DH), as shown in FIG. 6b.
Two H2D Responses (RSP), as shown in FIG. 6c.

In general, the number of messages in a given slot depends on the free space in the slot and the size of the messages to be sent.

Figure 7:
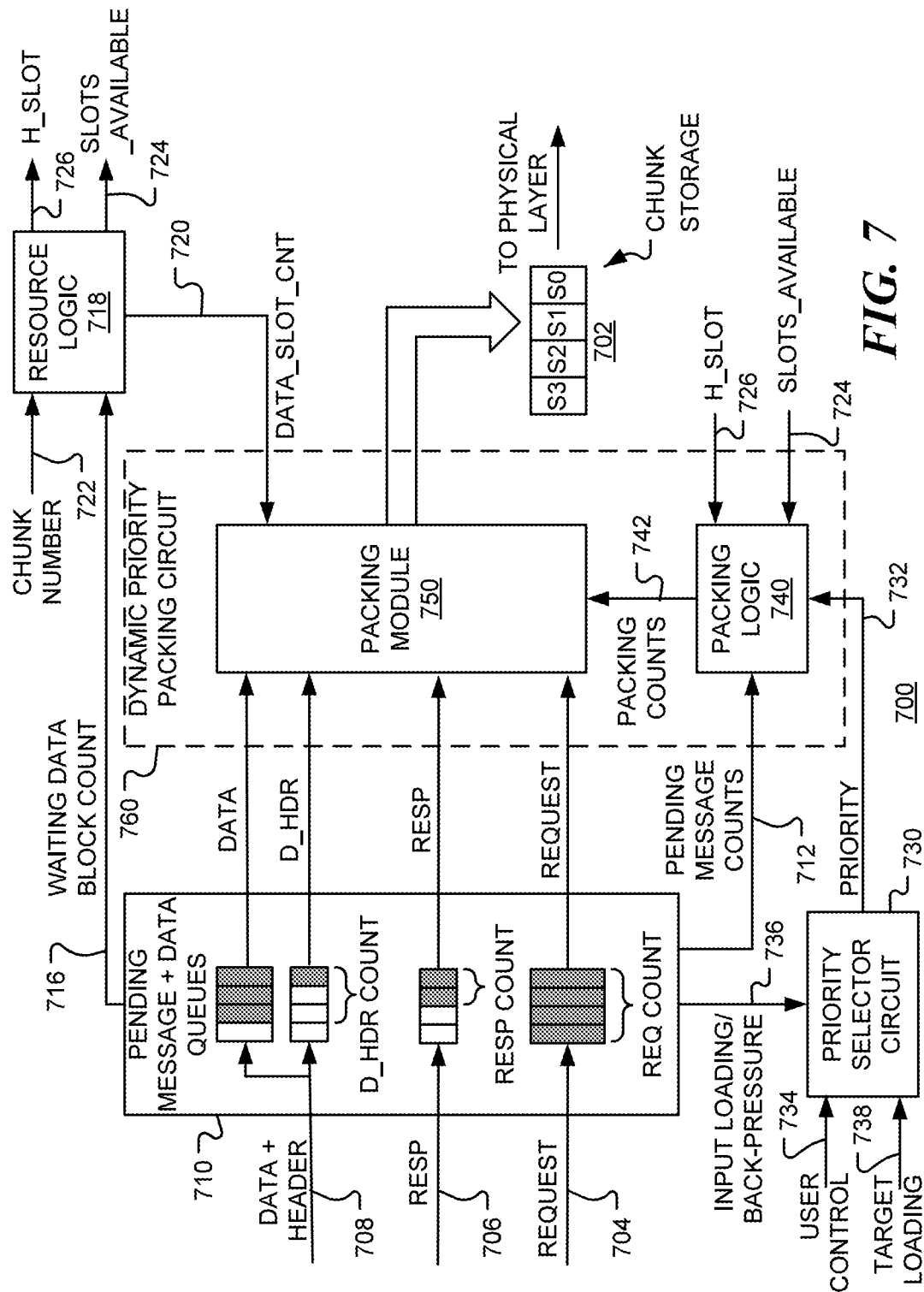
FIG. 7 is a block diagram of a packing generator, in accordance with various representative embodiments of the disclosure.

FIG. 7 is a block diagram of a packing generator 700 in accordance with various representative embodiments of the disclosure. In the example shown, packing generator 700 is operable in each cycle to fill four slots of a packet or chunk 702 with messages received from request channel 704 and response channel 706, together with messages (e.g., data headers) and data from data channel 708. Packet or chunk 702 may consist of four 16-byte slots to be packed in each cycle with messages and/or data. In general, packing generator 700 may receive any number of message types (e.g., in CXL™ 3 defines at least six message types) and packet 702 may be any size.

Received messages and data are stored in pending message and data queues in queuing block 710. The number of messages pending in each queue are provided as packing counts in signal 712 to packing logic block 740. A packing count (zero or more) may be generated for each kind of message. In this example there are only three kinds of messages (requests, responses and data plus header) but in general there may be multiple kinds of requests (e.g., snoop and read requests, snoop and write responses, read and write data, etc.). Packing logic block 740 is discussed below. In addition, the number of waiting data blocks 716 is passed to resource logic block 718. When a data header is packed into packet 702, the protocol specifies that the corresponding data must be sent in following packets. Data that cannot be packed in the same packet as its header is considered to be "waiting data" and takes priority over pending messages. In CXL™ 3, up to four data headers may be sent in a chunk. For cache transfers, for example, the data may be a 64-byte cache line (requiring four, 16-bytes four slots) and the data header may specify the associated cache tag. Packing logic block 740 and packet block 718 are discussed below.

Referring again to FIG. 3, different chunks of flit 300 have different amounts of space available for messages and data. In FIG. 7, resource logic block 718 determines the number 720 of data slots to be filled with waiting data. This depends both on the packet type 722 (i.e., the chunk number in the CXL™ example) and the number 716 of waiting data blocks. Resource logic block 718 also determines the number 724 of slots available for messages and/or extra data. This depends both on the chunk number and the number of slots used for data. Resource logic block 718 also determines if the chunk contains a header, as indicated by H_SLOT signal 726.

In accordance with various embodiments of the disclosure, packing generator 700 includes priority selector circuit 730. Circuit 730 generates priority indicator 732 that indicates which kind or group of messages has priority for packing. For example, data header messages may take priority over response and request messages, or vice versa. In another example, snoop messages may have higher priority than other messages. The priority may be selected based user control signal 734, or on certain conditions during operation. For example, channel back-pressure 736 may be provided by queueing block 710, with response and request messages prioritized when associated queues are filled. In addition, the packing priority of requests may be reduced when a target device is under a high load—as indicated by target loading feedback signal 738 from a target device. In this way, the packing priority is varied dynamically.

Packing logic block 740 receives following inputs:
Message pending counts 712 (e.g., host-to-device (H2D) requests, responses and data headers).
Slots available count 724. I.e., slots not designated for waiting data.
Priority indicator 732. This can be one bit or multiple bits, depending on number of priority classes.
Header slot input 726 to indicate when the chunk to be packed includes a header slot.

Packing logic block 740 table outputs packing counts 742 that indicate how many of each message kind are to be packed into chunk 702. Optionally, when one or more data header messages are to be packed, packing counts 742 may indicate the number of slots to be packed with data blocks associated with one of the data headers. The number of messages of any kind may be zero. Packing counts 742 and the number 720 of data slots to be filled with data are passed to packing module 750. Packing module 750 takes the specified numbers of messages and data blocks from the pending message and data queues 710 and packs them into packet or chunk 702 for transmission. Any specified header and error correction data is also generated and packed.

Together, packing logic block 740 and packing module 750 form a dynamic priority packing circuit 760. The dynamic priority packing circuit may be implemented in hardware for minimum latency in transmitting messages and data. The circuit may be specified, as module for example, by instructions of Hardware Description Language or Netlist and incorporated into the design of a chip.

FIG. 8 is a diagrammatic representation of a lookup table 800 that may be implemented in hardware in resource logic block 718, in accordance with various representative embodiments. The table is indexed by the chunk number and the number of waiting data blocks. CXL™ 3 uses four chunks, which are transmitted over consecutive cycles, and up to 16 16-byte data blocks may be waiting. The table indicates (a) if the chunk contains a header slot, (b) the number of slots to be filled with data blocks, and (c) the number of slots available for packing. Lookup table 800 is for a CXL™ 3 protocol. A different table may be used for other protocols.

Packing logic block 740 may be implemented, in hardware, as a lookup table. This approach avoids the latency associated with the use of state machine for packing.

FIGS. 9a and 9b show a lookup table of a packing logic block 740 in accordance with various representative embodiments. FIG. 9a shows the first half 900 of the table, while FIG. 9b shows the second half 950 of the table. The table may be used for an implementation where the packet or chunk to be filled consists of four slots that may be filled as shown in FIGS. 5a-5d and 6a-6c. The packing is based on the selected priority, the number of slots available, whether one of the slots is a header slot, the number of pending messages in each channel. These provide the inputs to the lookup table. In this simplified example, only three message channels are shown: request, data headers, and responses. These could be applied to CXL™ 3 type 1 host-to-device channels, for example. In general, the number of channels is specified in the protocol of the link. For example, CXL™ 3 uses 6 channels. For each combination of inputs, the lookup table indicates, as output, the number of requests, data headers and responses to be packed into the chunk or packet, in addition to the number of data blocks to be packed. For a given set of inputs, the lookup table is not unique, and different outputs may be selected during the design process.

In one embodiment, when one or more data headers are packed into a slot, any following slots are filled with data associated with the data headers.

The following two examples show how a lookup table works for cycles in forming a 256B flit, when there are four requests, four data headers, four responses pending. A single bit priority is used to distinguish between two priority class. Priority 0 indicates priority for request and response messages, while priority 1 indicates priority for data headers. The priority is dynamically changing every cycle. The presented examples illustrate the effect of the dynamic priority setting. The priority bits enables different decisions to be made at runtime.

Figure 10:
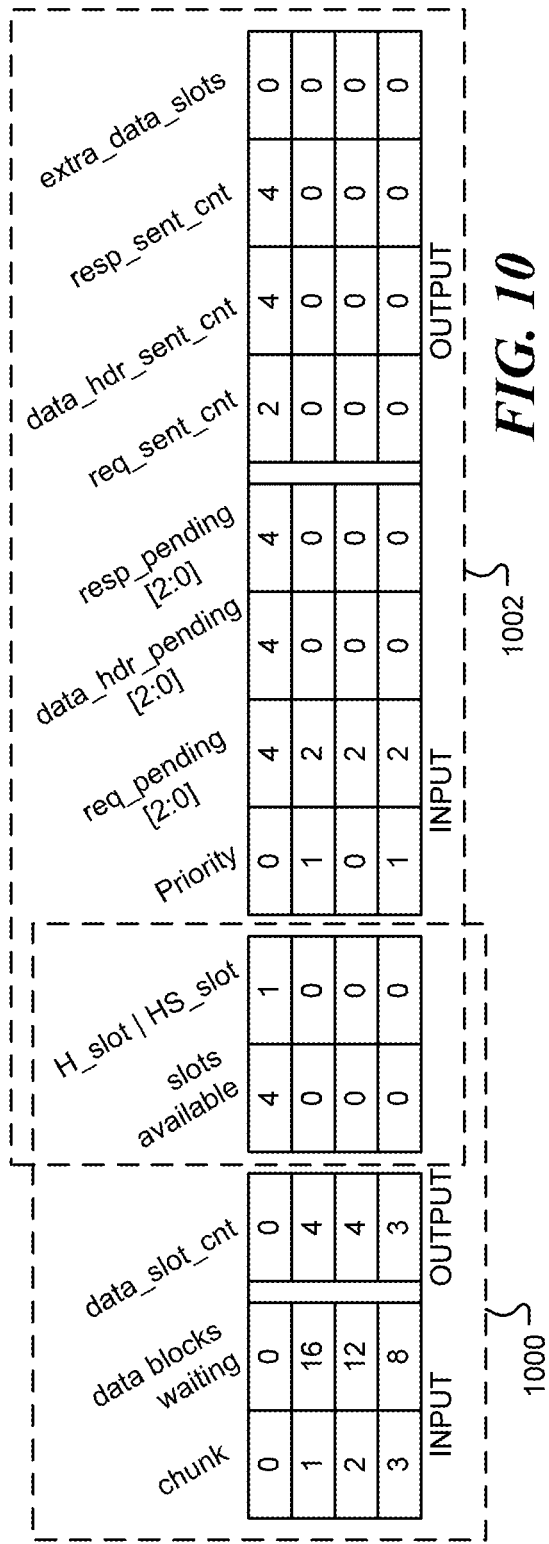
FIG. 10 shows a first example of dynamic priority packing, in accordance with various representative embodiments of the present disclosure.

FIG. 10 shows a first example of dynamic priority packing, in accordance with various representative embodiments. Each row of tables 1000 and 1002 corresponds to a cycle. Chunk 0 is packed in the first cycle, chunk 1 is packed in the second cycle and so on. Table 1000 shows operation of resource logic block 718. Table 1002 shows operation of an example packing logic block 740. Referring to table 1000, in the first cycle there are no waiting data so "data_slot_cnt" is zero, leaving 4 slots available in chunk 0. Chunk 0 includes a header slot, so "slots_available"=4 and "H_slot"=1 in the output of table 1000. These two values form inputs to table 1002. The first row of table 1002 also indicates that the priority is 0 in the first cycle, so higher priority is given to requests and responses over data and data headers. The outputs in table 1002, determined from the packing logic lookup table, indicate that two requests, four responses and four data headers are to be packed into chunk 0, with no data slot.

The second row of table 1000, for chunk 1 in cycle 2, now indicates that 16 bytes of data are waiting to be sent—corresponding to the four data headers packed in chunk 0. Since waiting data takes precedence, all four slots of chunk 1 are filled with data in the second cycle, leaving no available slots for messages. Accordingly, the output from table 1002 indicates that no messages or extra data are sent, since there are no available slots.

In the third cycle, there are still 12 data blocks waiting to be sent. Four of these are packed in chunk 2, leaving no available slots.

In the fourth cycle there are 8 data blocks waiting to be sent. Only three can be packed into chunk 3 since slot 15 is reserved for error correct data. Again, this leaves no slots available for messages. The remaining data will be sent in the next flit.

Figure 11:
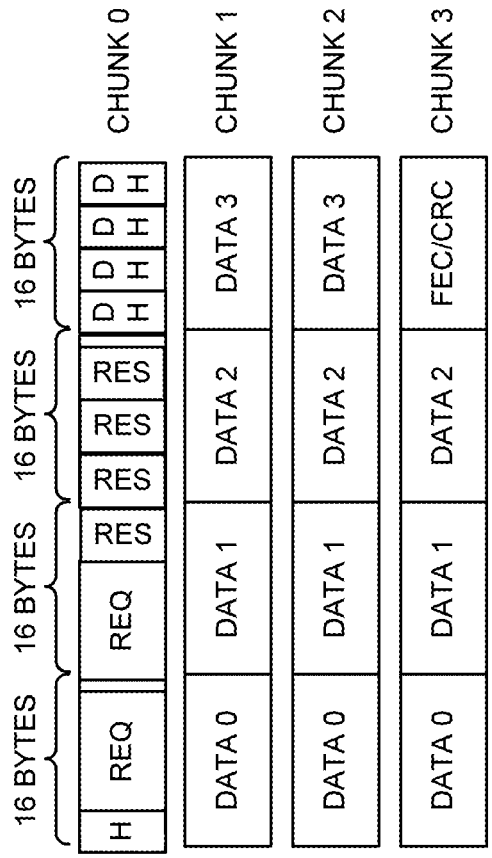
FIG. 11 shows the resulting packed flit for the first example.

FIG. 11 shows the resulting packed flit 1100 for the first example. "REQ" indicates a request, "DH" indicates a data header and "RES" indicates a response. Flit packing is achieved by a single access of the resource lookup table and the packing lookup table in each cycle. This introduces very little latency into the packing mechanism.

Figure 12:
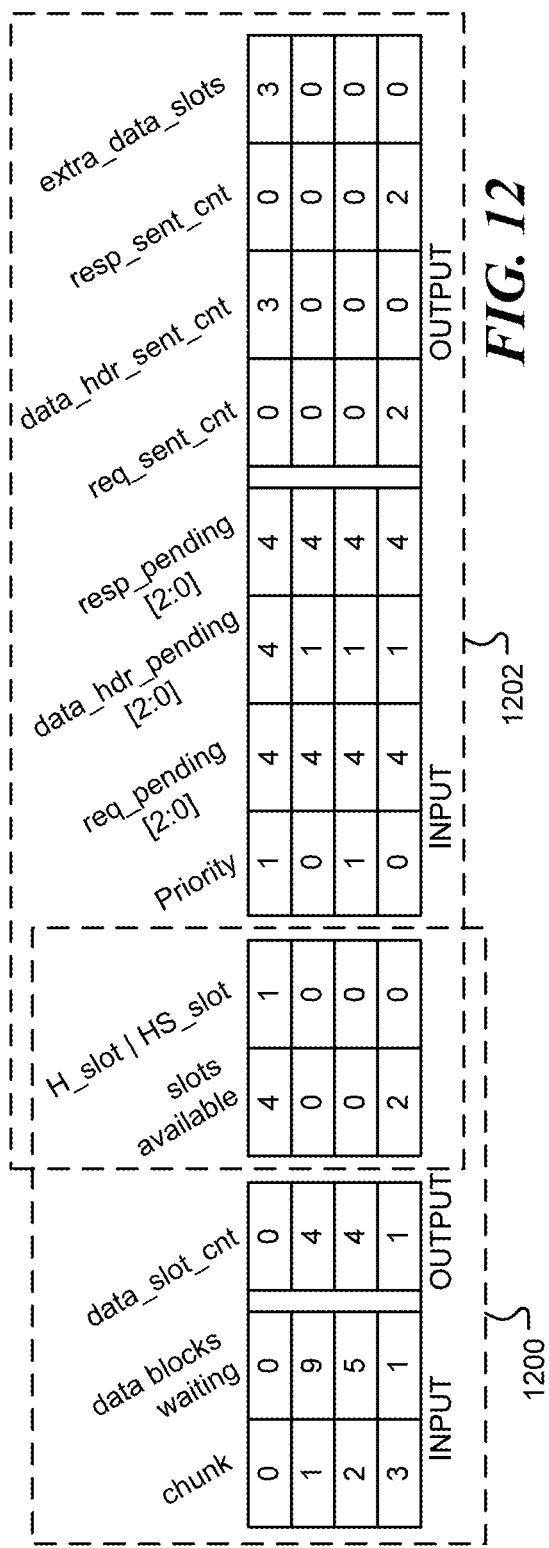
FIG. 12 shows a second example of dynamic priority packing, in accordance with various representative embodiments of the present disclosure.

FIG. 12 shows a second example of dynamic priority packing in accordance with various representative embodiments. As in FIG. 10, each row of tables 1200 and 1202 corresponds to a cycle. The number of pending messages is the same as in the previous example, but in this example the priority is set to 1 in the first cycle, indicating that priority is given to data over response and request messages. Accordingly, data headers are packed first. The first slot in chunk 0 is a header slot, which has space for three data headers. In this example, when one or more data headers are packed into a slot, any following slots are filled with data associated with the data headers. Thus, the remaining three slots are filled with data blocks associated with the first data header—as shown by the output in the first row of table 1202. Three data headers correspond to 12 data blocks, three of which are packed into chunk 0 in the first cycle. This leaves nine waiting data blocks in the second cycle, as indicated in the second row of table 1200. Four waiting data blocks are packed into each of chunk 1 and chunk 2, with the remaining waiting data block packed into chunk 3. This leaves two available slots in chunk 3, each of which can be packed with a request and a response, as indicated by the output of table 1202 for chunk 3.

Figure 13:
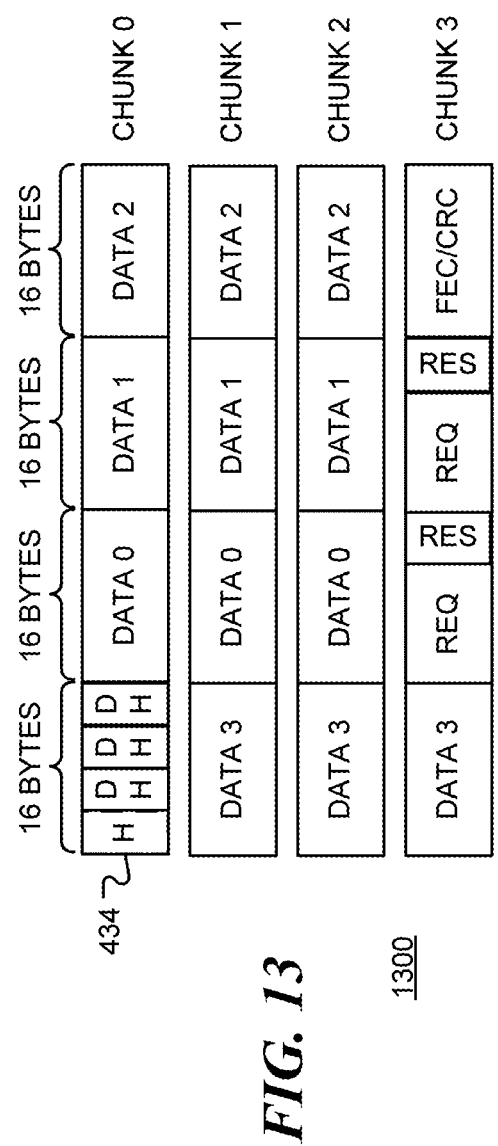
FIG. 13 shows the resulting packed flit for the second example.

FIG. 13 shows the resulting packed flit 1300 for the second example. Comparison of FIGS. 11 and 13 shows how flit packing is varied depending on the dynamically selected priority setting.

The dynamic priority packing circuit using the lookup table offers a way to achieve link layer flit packing without compromising on latency or message class performance. It provides the flexibility to make different decisions to pack single or multiple messages based on priority of mixed message classes. This approach simplifies design verification and reduces performance verification time—as it is easy to change an entry in the lookup table if it is decided to make changes based on performance data.

Figure 14:
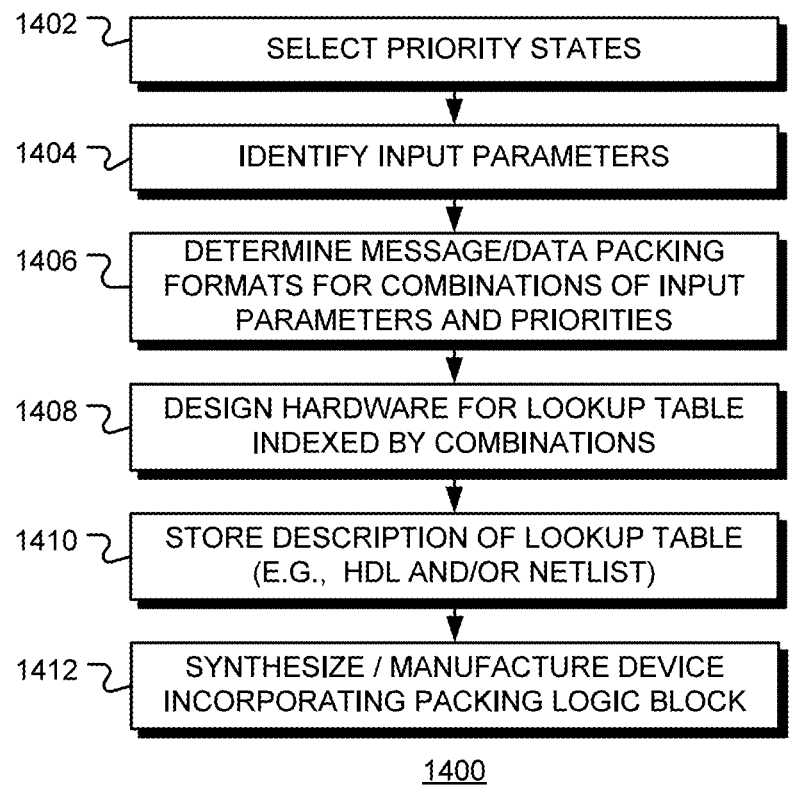
FIG. 14 is a flow chart of a method of designing a packing logic block, in accordance with various representative embodiments of the present disclosure.

FIG. 14 is a flow chart of a method 1400 of designing a packing logic block, in accordance with various representative embodiments. At block 1402, two or more priority classes are selected. A class might be, for example, a particular message, a group of messages, data, etc. In operation, the priority may be selected dynamically based on, for example, user input via programming instructions and/or one or more operating conditions such as input or target loadings. At block 1404, the other inputs to the packing logic are selected. These may include, for example, the number of pending messages of various kinds, and the space available in the packet or chunk for packing. At block 1406, packing configurations are determined for each of a plurality of input combinations, including the priority input. The packing configurations indicate the number (zero or more) of messages of each kind to be packed. At block 1408, a lookup table indexed by the inputs is designed to map each input combination to a corresponding packing configuration. The lookup table may be implemented in hardware to minimize latency introduced by the packing logic. The hardware, in turn, may be described by instructions of a hardware description language or a by a netlist of components and connections, for example. The instructions or netlist description may be stored on a computer readable medium at block 1410 for distribution or for use in synthesizing a hardware design. Optionally, at block 1412, the description is used to synthesize and manufacture a chip incorporating the packing logic as a module.

Figure 15:
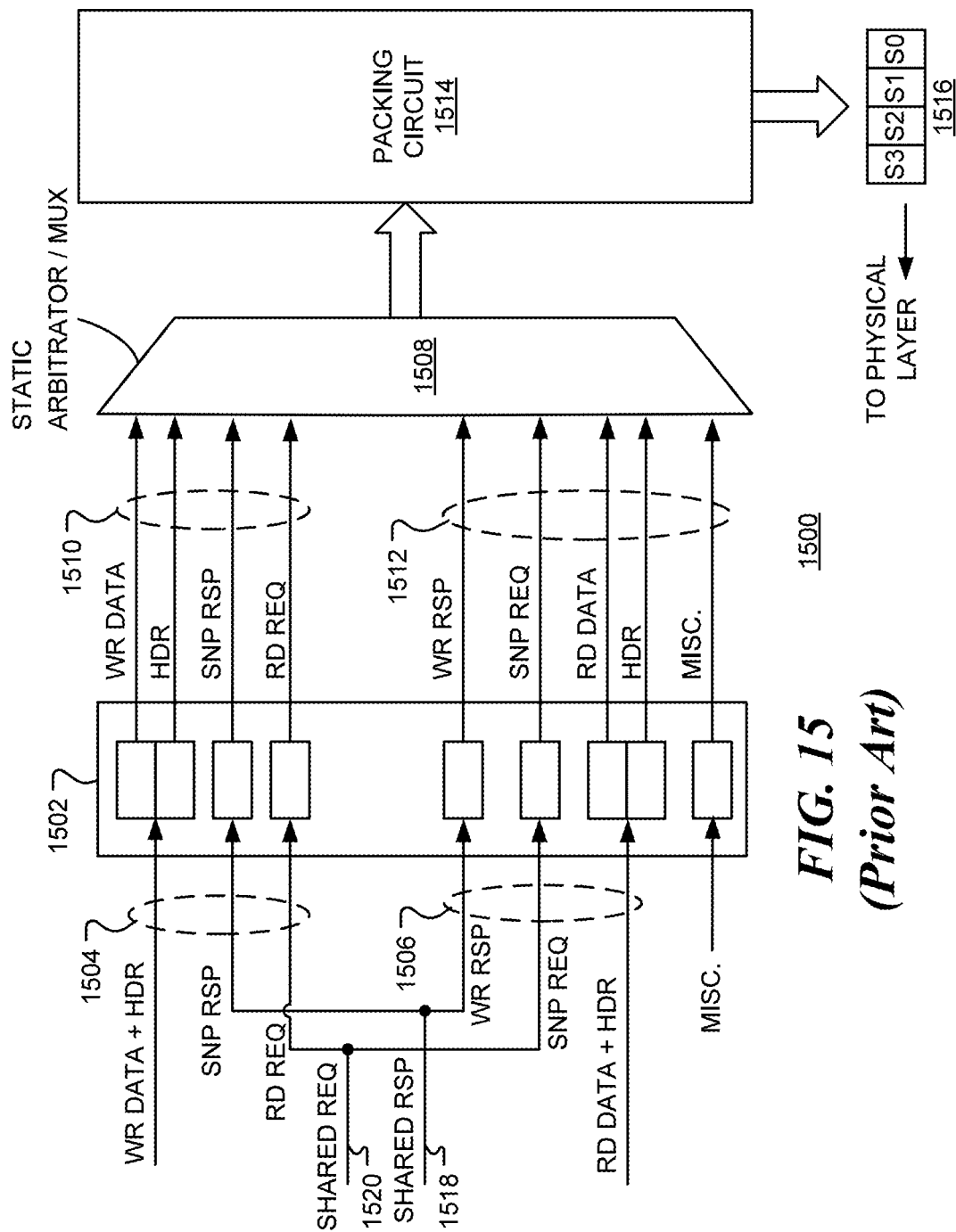
FIG. 15 is a block diagram of a static packing generator that uses static arbitration for flit packing rather than dynamic priority packing.

FIG. 15 is a block diagram of a static packing generator 1500 that uses static arbitration for flit packing rather than dynamic priority packing. Queuing logic 1502 of static packing generator 1500 receives group 1504 of three CXL™ type 3 messages: data messages for data to be written and associated headers (WR DATA+HDR), response messages for snoop responses (SNP RSP) and request messages for read requests (READ REQ). In addition, queuing logic 1502 receives group 1506 of three CXL™ type 1 messages: data messages for read data and associated header (RD DATA+HDR), response messages for write responses (WR RSP) and request messages for snoop requests (SNP REQ). Static packing generator 1500 may also receive additional messages on a miscellaneous channel (MISC) such as credits or error messages. The messages are grouped according to type. Static arbitrator and multiplexer 1508 selects messages and/or data from either message group 1510 or message group 1512. The selection is performed based on a "round robin" arbitration scheme. The message group selected by static arbitrator and multiplexer 1508 is passed to packing circuit 1514 for packing into flit 1516 for transmission to the physical layer of the link. In prior systems, the snoop responses (SNP RSP) and write responses (WR RSP) are received on a first shared channel 1518 and the snoop requests (SNP REQ) and read requests (RD REQ) are received on another shared channel 1520.

Figure 16:
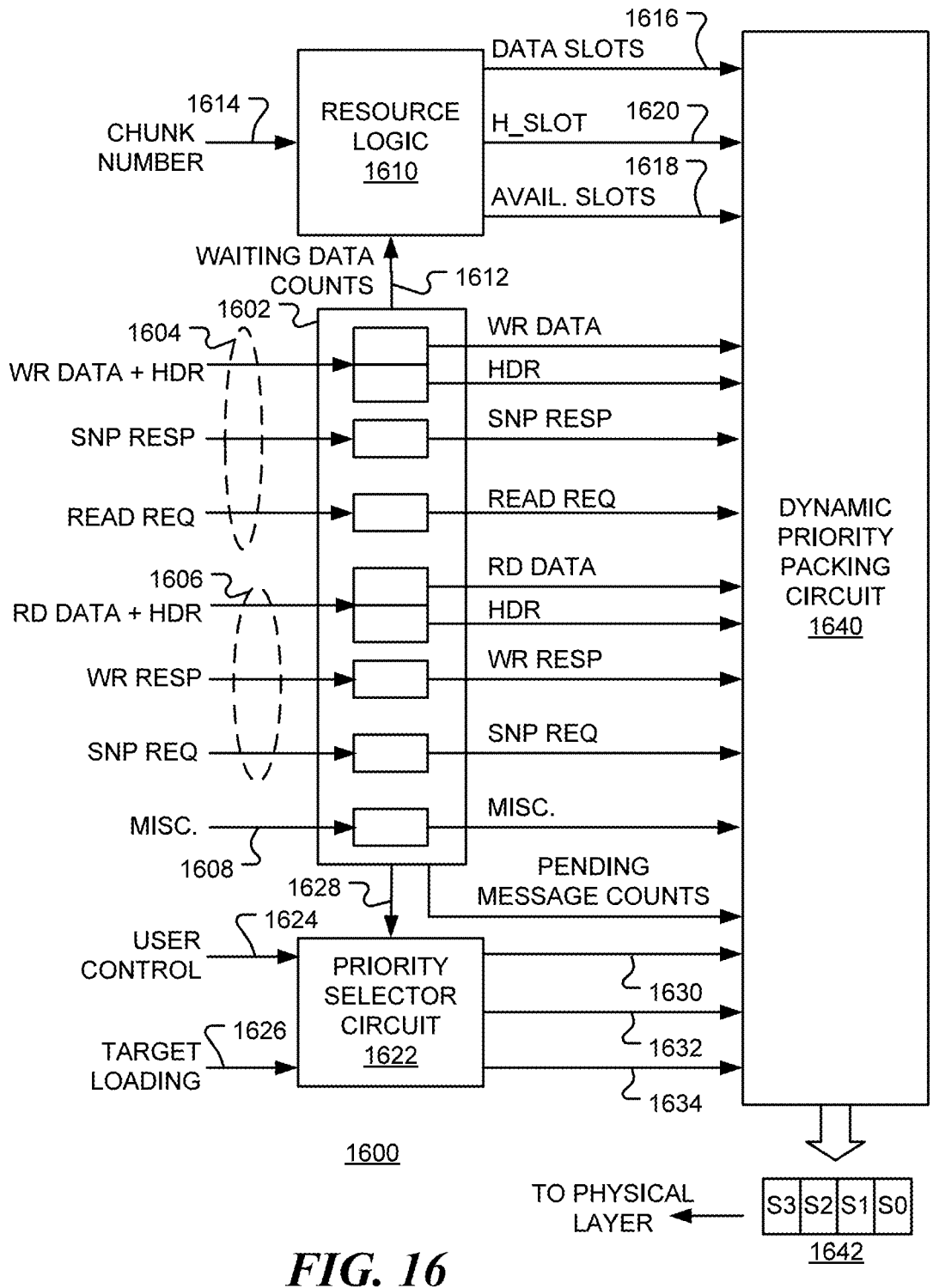
FIG. 16 is a block diagram of a packing generator that uses dynamic priority flit packing, in accordance with various representative embodiments of the present disclosure.

FIG. 16 is a block diagram of a packing generator 1600 that uses dynamic priority flit packing, in accordance with various representative embodiments of the present disclosure. Queuing logic 1602 of packing generator 1600 receives group 1604 of three CXL™ type 3 channels: a data channel for data to be written and associated headers (WR DATA+HDR), a response channel for snoop responses (SNP RESP) and request channel for read requests (READ REQ)/ Queuing logic 1602 of packing generator 1600 also receives group 1606 of three CXL™ type 1 channels: a data channel for read data and associated header (RD DATA+HDR), a response channel for write responses (WR RESP) and a request channel for snoop requests (SNP REQ). Packing generator 1600 also receives additional messages such as credits or error messages on miscellaneous channel 1608 (MISC). In addition to queuing logic 1602, the packing generator 1600 includes resource logic block 1610 that, based on waiting data counts 1612 and chunk number 1614, determines the minimum number 1616 of data slots needed in the current chunk, the number 1618 of available slots and an indicator 1620 of whether an available slot is a header slot. Packing generator 1600 includes priority selector circuit block 1622 that, based on user control 1624, target loading 1626 and input backpressure (input loading) 1628, determines packing priority settings. In the example shown:

data priority 1630 has value 1 for read/write data priority and value 0 for read/snoop request/response priority, message priority 1632 has value 1 for type 1 message priority and value 0 for type 3 message priority, priority 1634 has value 1 when miscellaneous message have priority and value 0 otherwise.

Priorities 1630, 1632 and 1634, together with resource logic block outputs 1616, 1618 and 1620, are input to dynamic priority packing circuit 1640. Based on these inputs, dynamic priority packing circuit 1640 selects messages and/or data from the queues in queue logic 1602 to be packed into a chunk 1642. In contrast to an arbitration approach, a mixture of messages and data of different types may be packed into a single flit, thereby increasing utilization of communication link. Dynamic priority packing circuit 1640 may include a lookup table, implemented in hardware, that selects items for be packed of each combination of inputs.

In contrast to the arbitration system of FIG. 15, there is no need to group messages according to type, and messages of more than one type may be packed into the same chunk or packet. In addition, dynamic packing enables packing decisions to be made based on workloads/traffic patterns. For example, a decision can be made whether to give a priority to non-data or a data request/response. In a CXL™ application, a dynamic decision can be made whether to prioritize .mem traffic or .cache traffic. This can be done, for example, by making use of "devload" field in the .mem response which tells the host whether device traffic is overloaded or not to process .mem requests. In some cycles, snoop requests may be prioritized to reduce the lifetime of an original request at local Home Node of a network.

A priority indicator may be a signal having 1 or more bits. For example, in FIG. 16, three bits are used, shown separately as 1630, 1632 and 1634. This gives 8 different dynamic packing options for the same set of inputs.

The use of priorities removes need for shared channels between a request agent and the packing logic. In addition, it is no longer required to use shared channels for read and snoop requests or for write and snoop responses.

FIG. 17 is a table 1700 showing operation of a gateway packing logic block that uses an arbitrator rather than dynamic priority packing. Table 1700 shows operation over 12 cycles, as indicated by the left-most column of the table. In each cycle, one chunk of a flit is to be packed. In accordance with CXL™ 3 protocol, a chunk comprises four 16-byte slots, and a flit comprises four chunks, as indicated by the chunk number in the second column of the table. The current state of the gateway includes pending messages and data. At the start of each cycle, a number of 16-bytes data blocks are waiting to be sent, as shown in the "Waiting data" column of the table. These data blocks are associated with data headers that have previously been packed. In this example, each data header is associated with a 64-byte cache line which holds four data blocks. In the example shown, the current state includes pending message counts for three CXL™ type 3 messages (Rd Req, Wr Req+data, and Snp Rsp) and three CXL™ type 1 messages (Snp Req, Rd Rsp+data, and Wr Rsp). From the number of waiting data blocks and chunk number, the number of message slots available 1702 is determined.

Packing is controlled by an arbitrator. The arbitrator operates in a round robin manner and alternatively selects between type 1 messages and type 3 messages (as indicated by arbiter value 1704). Table 1700 shows the packing results for messages and data. For example, in the first cycle, only type 1 messages are selected for packing into chunk 0 (2 Snp Req, 2 Rd Rsp headers and 4 Wr Rsp) since the arbiter value is 1. No data is packed. In the next two cycles, there is waiting data associated with the headers, so these are packed in chunks 1 and 2. In the fourth cycle, only type 0 messages are selected for packing into chunk 3 (2 Rd Req and 3 Snp Rsp) since the arbiter value is 0. No data is packed. In this manner all of the pending messages are sent using 12 chunks (three flits). However, in cycles 5, 7 and 9, some of the slots in the packed chunk remain empty. Thus, the second flit (packed in cycles 5-8) is not fully utilized and the link is not operating at maximum efficiency.

FIG. 18 is a table 1800 showing operation of gateway packing logic block that uses dynamic priority packing, in accordance with various representative embodiments of the present disclosure. As in FIG. 17, the table shows the state of the gateway at consecutive cycles together with the packing results. In table 1800, the current state and the chunk number is used to determine the number 1802 of message slots available and an indicate 1804 of whether one of the slots is a header slot. Columns 1806 show the value of a 2-bit priority indicator in each cycle. The first bit of the priority indicator has value 1 for type 1 priority and value 0 for type 3 priority. The second bit of the priority indicator has value 1 for data priority and value 0 non-data priority. In this example, priority is given to type 1 messages and to data messages in all cycles. In contrast to the arbiter example, all slots of all the chunks in the second flit are filled in cycles 5-8, providing optimal efficiency. It is noted that in cycles 2, 4 and 6, the packed chunk contains a mixture of type 1 and type 3 messages. The final flit is not fully utilized since all pending messages and data have been sent.

FIGS. 19-22 show four additional examples of operation of a gateway packing logic block that uses dynamic priority packing, in accordance with various representative embodiments of the present disclosure. Again, table 1900, 2000, 2100 and 2200 show the state of the gateway and corresponding packing results for a number of cycles.

In FIG. 19 priority is given to type 3 messages over type 1 messages and to data messages over non-data messages. It is noted that there are two snoop requests pending at the of end of cycle 10. The CXL™ 3 specification states that the packing logic can only two snoop requests every 128 bytes (i.e., every two chunks or 8 slots), so the packing logic cannot schedule the pending snoops in clock 11. In this simple example, there are no other messages to send, so the chunk is left empty in cycle 11.

In FIG. 20 priority is given to type 1 messages over type 3 messages and to non-data messages over data messages.

In FIG. 21 priority is given to type 1 messages over type 3 messages and to data messages over non-data messages.

In FIG. 22 priorities are dynamically varied from one cycle to the next.

In all of the example, the first two flits are fully packed, indicating improved packing efficiency compared to use of a packing arbitrator.

The following embodiments may be combined.

One embodiment provides a computer-implemented method including determining, for two or more message kinds in a data processing network, pending message counts for the message kind for transmission across a communication link of the data processing network, dynamically determining one or more priorities for sending the message kinds, determining, based, at least in part, on the pending message counts and the one or more priorities, a number of messages of one or more message kinds to be packed into a transmission packet, and packing the determined number of messages of one or more message kinds into the transmission packet for transmission across the communication link of the data processing network.

In another embodiment of the computer-implemented method the message kinds include a first group of messages of a first type and a second group of messages of a second type, and where the message to be packed into the transmission packet includes at least one message of the first type and at least one message of the second type.

In another embodiment of the computer-implemented method, determining the number of messages of one or more message kinds to be packed into the transmission packet is further based on a number of available message slots in the transmission packet.

In another embodiment of the computer-implemented method, determining the number of messages of one or more message kinds to be packed into the transmission packet includes accessing a lookup table based, at least in part, on the pending message counts, the one or more priorities, a number of available message slots in the transmission packet and/or a type of the transmission packet.

Another embodiment of the computer-implemented method includes configuring the lookup table based, at least in part, on message sizes and on available space in the transmission packet.

In another embodiment of the computer-implemented method dynamically determining the one or more priorities for sending the message kinds includes determining priorities by a "weighted round robin" method, where weights of the "weighted round robin" method are based, at least in part, on the pending message counts, the one or more priorities, a number of available message slots in the transmission packet and/or a type of the transmission packet.

In another embodiment of the computer-implemented method, dynamically determining the one or more priorities for sending the message kinds includes monitoring backpressure in one or more pending message queues and increasing a priority for a message kind with higher backpressure.

In another embodiment of the computer-implemented method, transmitting the transmission packet across the communication link of the data processing network includes transmitting the transmission packet to a target device, and where dynamically determining the one or more priorities for sending the message kinds includes determining device load in the target device based on feedback from the target device and setting a lower priority for a message kind that increase the device load when the device load is high.

In another embodiment of the computer-implemented method, a message kind of the two or more message kinds includes data and an associated data header.

Another embodiment of the computer-implemented method includes combining the transmission packet with one or more other transmission packets to form a flow control unit (flit), adding header data and error correction data to the flit and transmitting the flit across the communication link of the data processing network.

In another embodiment of the computer-implemented method the messages to be packed into the transmission packet include one or more messages of a message kind associated with a first priority of the one or more priorities, and one or more messages of a message kind associated with a second priority of the one or more priorities.

Another embodiment of the disclosure provides a computer-implemented method including determining, for two or more message kinds in a data processing network, pending message counts for the message kind for transmission across a communication link of the data processing network, determining a number of messages of one or more message kinds to be packed into a transmission packet, and packing the determined number of messages of one or more message kinds into the transmission packet for transmission across the communication link of the data processing network. Determining the number of messages of one or more message kinds to be packed into the transmission packet includes accessing a lookup table based, at least in part, on the pending message counts, a number of available message slots in the transmission packet, and/or a type of the transmission packet.

Another embodiment of the computer-implemented method includes dynamically determining one or more priorities for sending the message kinds, where determining the number of messages of one or more message kinds to be packed into the transmission packet is further based on the one or more priorities.

Another embodiment of the disclosure provides a communication gateway that includes a message queue for each of two or more message kinds configured to store pending messages of the message kind, transmission packet storage, a priority selector circuit configured to generate a priority indicator, and a dynamic priority packing circuit. The dynamic priority packing circuit is configured to determine a number of messages of one or more message kinds to be packed into the transmission packet and pack the determined number of messages of each message kind into a transmission packet in the transmission packet storage. The number of messages of one or more message kinds to be packed into the transmission packet is based, at least in part, on counts of pending messages in each of the message queues and the priority indicator. The communication gateway is configured to transmit the transmission packet to a communication link of a data processing network.

In another embodiment of the communication gateway, the priority selector circuit is structured to generate the priority indicator responsive to an input loading signal, a target loading signal based on feedback from a target device, and/or a user control signal.

In another embodiment of the communication gateway, the dynamic priority packing circuit includes a lookup table configured to determine the number of messages of one or more message kinds to be packed into the transmission packet.

In another embodiment of the communication gateway, the dynamic priority packing circuit is further configured to determine the number of messages of one or more message kinds to be packed into the transmission packet based, at least in part, on a number of available message slots in the transmission packet and/or properties of one or more slots in the transmission packet.

In another embodiment of the communication gateway, the priority indicator includes a plurality of bits indicating priorities of a plurality of different kinds of messages or message groups.

In another embodiment of the communication gateway, the plurality of bits of the priority indicator include a first bit indicating whether priority is given to messages of a first kind or messages of a second kind and a second bit indicating whether priority is given to a data messages or non-data messages.

In another embodiment of the disclosure, the communication gateway is defined by instructions of a Hardware Definition Language or a Netlist stored on a non-transitory computer readable medium.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or," as used herein, is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

As used herein, the term "configured to," when applied to an element, means that the element may be designed or constructed to perform a designated function, or that is has the required structure to enable it to be reconfigured or adapted to perform that function.

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Those skilled in the art will recognize that the present disclosure has been described by means of examples. The present disclosure could be implemented using hardware component equivalents such as special purpose hardware and/or dedicated processors which are equivalents to the present disclosure as described and claimed. Similarly, dedicated processors and/or dedicated hard wired logic may be used to construct alternative equivalent embodiments of the present disclosure.

Dedicated or reconfigurable hardware components used to implement the disclosed mechanisms may be described, for example, by instructions of a hardware description language (HDL), such as VHDL, Verilog or RTL (Register Transfer Language), or by a netlist of components and connectivity. The instructions may be at a functional level or a logical level or a combination thereof. The instructions or netlist may be input to an automated design or fabrication process (sometimes referred to as high-level synthesis) that interprets the instructions and creates digital hardware that implements the described functionality or logic.

The HDL instructions or the netlist may be stored on non-transitory computer readable medium such as Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations carried out can often be varied, additional operations can be added, or operations can be deleted without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A computer-implemented method comprising:
    determining, for two or more message kinds, counts of pending messages for each message kind, where the messages are pending packing into a transmission packet for transmission across a communication link of a data processing network;
    dynamically determining one or more priorities for sending the message kinds;
    determining, based, at least in part, on the counts of pending messages and the one or more priorities, a number of messages of one or more message kinds to be packed into a transmission packet; and
    packing the determined number of messages of one or more message kinds into the transmission packet for transmission across the communication link of the data processing network.

2. The computer-implemented method of claim 1, where the message kinds include a first group of messages of a first type and a second group of messages of a second type, and where the message to be packed into the transmission packet includes at least one message of the first type and at least one message of the second type.

3. The computer-implemented method of claim 1, where determining the number of messages of one or more message kinds to be packed into the transmission packet is further based on a number of available message slots in the transmission packet.

4. The computer-implemented method of claim 1, where determining the number of messages of one or more message kinds to be packed into the transmission packet includes accessing a lookup table based, at least in part, on one or more of:
    the counts of pending messages;
    the one or more priorities;
    a number of available message slots in the transmission packet; and
    a type of the transmission packet.

5. The computer-implemented method of claim 4, further comprising configuring the lookup table based, at least in part, on message sizes and on available space in the transmission packet.

6. The computer-implemented method of claim 1, where dynamically determining the one or more priorities for sending the message kinds includes determining priorities by a "weighted round robin" method, where weights of the "weighted round robin" method are based, at least in part, on one or more of:
   the counts of pending messages;
   the one or more priorities;
   a number of available message slots in the transmission packet; and
   a type of the transmission packet.

7. The computer-implemented method of claim 1, where dynamically determining the one or more priorities for sending the message kinds includes:
   monitoring backpressure in one or more pending message queues; and
   increasing a priority for a message kind with higher backpressure.

8. The computer-implemented method of claim 1, where transmitting the transmission packet across the communication link of the data processing network includes transmitting the transmission packet to a target device, and where dynamically determining the one or more priorities for sending the message kinds includes:
   determining device load in the target device based on feedback from the target device; and
   setting a lower priority for a message kind that increase the device load when the device load is high.

9. The computer-implemented method of claim 1, where a message kind of the two or more message kinds includes data and an associated data header.

10. The computer-implemented method of claim 1, further comprising:
    combining the transmission packet with one or more other transmission packets to form a flow control unit (flit);
    adding header data and error correction data to the flit; and
    transmitting the flit across the communication link of the data processing network.

11. The computer-implemented method of claim 1, where the messages to be packed into the transmission packet include:
    one or more messages of a message kind associated with a first priority of the one or more priorities; and
    one or more messages of a message kind associated with a second priority of the one or more priorities.

12. A computer-implemented method comprising:
    determining, for two or more message kinds in a data processing network, a count of pending messages for each message kind, where the messages are pending packing into a transmission packet for transmission across a communication link of the data processing network;
    determining a number of messages of one or more message kinds to be packed into a transmission packet, said determining including accessing a lookup table based, at least in part, on one or more of:
       the counts of pending messages;
       a number of available message slots in the transmission packet; and
       a type of the transmission packet; and
    packing the determined number of messages of one or more message kinds into the transmission packet for transmission across the communication link of the data processing network.

13. The computer-implemented method of claim 12, further comprising:
    dynamically determining one or more priorities for sending the message kinds;
    where determining the number of messages of one or more message kinds to be packed into the transmission packet is further based on the one or more priorities.

14. A communication gateway comprising:
    a message queue for each of two or more message kinds configured to store messages of the message kind received at the communication gateway pending packing into transmission packets for transmission across a communication link of a data processing network;
    transmission packet storage;
    a priority selector circuit configured to generate a priority indicator; and
    a dynamic priority packing circuit configured to:
       determine a number of messages of one or more message kinds to be packed into the transmission packet based, at least in part, on counts of pending messages in each message queue and the priority indicator; and
       pack the determined number of messages of one or more message kinds into a transmission packet in the transmission packet storage;
    the communication gateway configured to transmit the transmission packet to a communication link of a data processing network.

15. The communication gateway of claim 14, where the priority selector circuit is structured to generate the priority indicator responsive to one or more of:
    an input loading signal;
    a target loading signal based on feedback from a target device; and
    a user control signal.

16. The communication gateway of claim 14, where the dynamic priority packing circuit includes a lookup table configured to determine the number of messages of one or more message kinds to be packed into the transmission packet.

17. The communication gateway of claim 14, where the dynamic priority packing circuit is further configured to determine the number of messages of one or more message kinds to be packed into the transmission packet based, at least in part, on either or both of:
    a number of available message slots in the transmission packet, and
    properties of one or more slots in the transmission packet.

18. The communication gateway of claim 14, where the priority indicator includes a plurality of bits indicating priorities of a plurality of different kinds of messages or message groups.

19. The communication gateway of claim 18, where the plurality of bits of the priority indicator include:
    a first bit indicating whether priority is given to messages of a first kind or messages of a second kind; and
    a second bit indicating whether priority is given to a data messages or non-data messages.

20. A non-transitory computer readable medium containing instructions of a Hardware Definition Language or a Netlist defining the communication gateway of claim 14.

* * * * *